US012533562B2

(12) United States Patent
Niu et al.

(10) Patent No.: US 12,533,562 B2
(45) Date of Patent: Jan. 27, 2026

(54) POWER METER FOR ROWING MACHINE, AND ROWING MACHINE

(71) Applicant: GUANGDONG COROS SPORTS TECHNOLOGY CO., LTD, Dongguan (CN)

(72) Inventors: Haotian Niu, Dongguan (CN); Yu Tang, Dongguan (CN); Huicong Zhang, Dongguan (CN); Kai Chen, Dongguan (CN)

(73) Assignee: GUANGDONG COROS SPORTS TECHNOLOGY CO., LTD, Dongguan (CN)

( * ) Notice: Subject to any disclaimer, the term of this patent is extended or adjusted under 35 U.S.C. 154(b) by 91 days.

(21) Appl. No.: 18/743,822

(22) Filed: Jun. 14, 2024

(65) Prior Publication Data
US 2024/0416205 A1    Dec. 19, 2024

(30) Foreign Application Priority Data

Jun. 14, 2023   (CN) ........................ 202310704513.X

(51) Int. Cl.
*A63B 69/06* (2006.01)
*A63B 22/00* (2006.01)
*A63B 71/06* (2006.01)

(52) U.S. Cl.
CPC .......... *A63B 69/06* (2013.01); *A63B 22/0076* (2013.01); *A63B 71/0619* (2013.01); *A63B 2022/0079* (2013.01); *A63B 2069/062* (2013.01); *A63B 2071/065* (2013.01); *A63B 2220/20* (2013.01); *A63B 2220/51* (2013.01); *A63B 2220/58* (2013.01); *A63B 2220/833* (2013.01)

(58) Field of Classification Search
CPC ... A63B 21/153; A63B 22/0076; A63B 69/06; A63B 71/0619; A63B 2022/0079; A63B 2069/062; A63B 2071/065; A63B 2220/20; A63B 2220/51; A63B 2220/58; A63B 2220/833
See application file for complete search history.

(56) References Cited

U.S. PATENT DOCUMENTS

| | | | | |
|---|---|---|---|---|
| 4,824,103 A | * | 4/1989 | Smidt | A63B 24/00 600/595 |
| 8,491,446 B2 | * | 7/2013 | Hinds | A63B 21/4021 482/8 |
| 8,806,952 B1 | * | 8/2014 | Glass | A63B 61/02 73/826 |
| 9,561,400 B2 | * | 2/2017 | Soerensen | A63B 24/0062 |
| 10,471,297 B1 | * | 11/2019 | Smith | A63B 24/0087 |
| 11,130,017 B2 | * | 9/2021 | Smith | A63B 21/0057 |

(Continued)

*Primary Examiner* — Joshua Lee
(74) *Attorney, Agent, or Firm* — ANOVA LAW GROUP, PLLC

(57) ABSTRACT

A power meter includes a housing, a fixation assembly arranged at two ends of the housing, and a tension detection device arranged inside the housing and connected to the fixation assembly. The fixation assembly is configured to be detachably connected to two mechanical coupling members of a tension assembly of a rowing machine to cause a part of the tension assembly between the two mechanical coupling members to be in a relaxed state. The tension detection device is configured to detect a pulling force applied on the fixation assembly.

18 Claims, 4 Drawing Sheets

(56) References Cited

U.S. PATENT DOCUMENTS

| | | | |
|---|---|---|---|
| 11,766,588 B2* | 9/2023 | Smith | A63B 22/0087 |
| | | | 482/72 |
| 12,296,225 B2* | 5/2025 | Gable | A63B 71/0622 |
| 12,311,223 B2* | 5/2025 | Smith | A63B 24/0087 |
| 2008/0119763 A1* | 5/2008 | Wiener | A61B 5/224 |
| | | | 600/587 |

* cited by examiner

POWER METER FOR ROWING MACHINE, AND ROWING MACHINE

CROSS-REFERENCE TO RELATED APPLICATION

This application claims priority to Chinese Application No. 202310704513.X filed Jun. 14, 2023, the entire content of which is incorporated herein by reference.

TECHNICAL FIELD

The present disclosure generally relates to the fitness equipment technology field and, more particularly, to a power meter for a rowing machine and the rowing machine.

BACKGROUND

A rowing machine is also known as a rowing ergometer, rowing device, on-land rowing machine, or indoor rowing machine. The rowing machine is for training purposes and is configured to simulate water rowing sport. The rowing machine usually includes a base and a tension assembly arranged at the base. One end of the tension assembly is connected to a weight, and another end of the tension assembly is for the user to hold. During a training process, the user sits on the base, holds one end of the tension assembly, and continuously lifts and lowers the other end of the tension assembly to train muscle groups. To achieve refined management, the tension applied by the user at the tension assembly needs to be tested. In the existing technology, most rowing machines are not equipped with a special-purpose power meter. The tension applied by the user at the tension assembly is not able to be detected. A few rowing machines include power handles at the end of the tension assembly for the user to hold. However, the manufacturing cost of the power handle is high, and the power handle is only suitable for a small number of rowing machines and is not suitable for rowing machines with undetachable handles.

SUMMARY

A first purpose of the present disclosure provides a power meter for a rowing machine. The power meter for the rowing machine has a simple structure, low manufacturing cost, and a broad suitable application range. The power meter can be suitable for various types of rowing machines.

A second purpose of the present disclosure provides a rowing machine. The rowing machine can accurately detect the pulling force applied by a user at the tension assembly and has a simple structure and low cost.

To realize the technical effects, the technical solution of the present disclosure is as follows.

The present disclosure provides a power meter applied to the rowing machine. The rowing machine includes a tension assembly. One end of the tension assembly is connected to a weight, and the other end is held by a user. The power meter includes a housing, fixation assembly, the fixation assembly being arranged at two ends of the housing, and a tension detection device, the tension detection device being arranged inside the housing and connected to the fixation assembly. The tension detection device is configured to detect a pulling force applied on the fixation assembly. The tension assembly includes two mechanical coupling members. The fixation assembly is detachably connected to the two mechanical coupling members, to cause a part of the tension assembly between the two mechanical coupling members to be in a relaxed state.

In some embodiments, the fixation assembly includes two fixation sub-members, the two fixation sub-members are arranged at two ends of the tension detection device, respectively, and the two ends of the tension detection device are mechanically coupled to the two fixation sub-members respectively.

In some embodiments, each fixation sub-member includes a first fixation plate, the first fixation plate being connected to an end of the tension detection device, and a press plate, the press plate being connected to the first fixation plate, and the mechanical coupling member being clamped between the first fixation plate and the press plate.

In some embodiments, the fixation sub-member further includes a lock member, and the lock member passes through the first fixation plate and the press plate and is configured to clamp the mechanical coupling member between the press plate and the first fixation plate.

In some embodiments, two lock members are provided, and the two lock members are arranged on two sides of the mechanical coupling member.

In some embodiments, the fixation sub-member includes a first winding member, the first winding member cooperates with the mechanical coupling member, and the mechanical coupling member is wound at least one turn around the first winding member.

In some embodiments, the fixation sub-member includes a second fixation plate, the second fixation plate is connected to an end of the tension detection device, the second fixation plate includes a fitting groove, one end of the fitting groove is open, the mechanical coupling member passes through the fitting groove and being clamped at the fitting groove by a press member passing through the second fixation plate.

In some embodiments, the second fixation plate further includes a second winding member, and the mechanical coupling member passes through the fitting groove and is wound around the second winding member.

In some embodiments, a distance detection device is further arranged within the housing.

The present disclosure further provides a rowing machine including a body of the rowing machine, a tension assembly, and the power meter for the rowing machine according to any one of claims 1-9. One end of the tension assembly cooperates with the body of the rowing machine, and the other end is connected to a handle. The power meter for the rowing machine is detachably arranged at the middle of the tension assembly.

The power meter for the rowing machines of the present disclosure includes the following beneficial effects. The fixation assembly of the power meter of the present disclosure is detachably connected to the tension assembly and are not connected to the end of the tension assembly for the user to hold. During actual use, the power meter can be connected at any position in the middle of the tension assembly through the fixation assembly to make the power meter suitable for many types of rowing machines. Meanwhile, the power meter only includes the housing, fixation assembly, and the tension detection device. The structure is very simple and the manufacturing cost is low. During the detection process, the tension detection device detects the pulling force directly applied by the user on the tension assembly. The detection precision is high.

The rowing machine of the present disclosure has the following beneficial effects. With the power meter for the rowing machine described above, the rowing machine can accurately detect the pulling force applied by the user on the tension assembly, and have a simple structure and low cost.

Additional aspects and advantages of the present disclosure are provided in the following description, some can become obvious from the description or can be learned through the implementation of the present disclosure.

Figure 1:
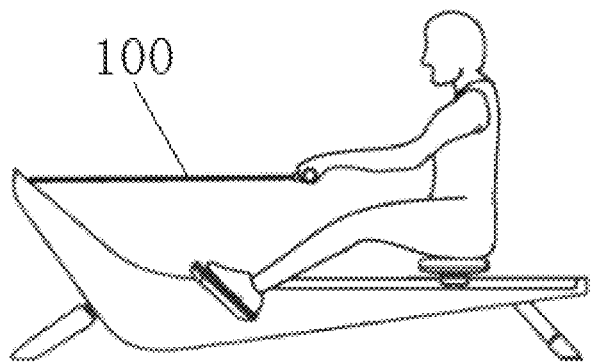
FIG. 1 is a schematic diagram showing a user using a rowing machine according to some embodiments of the present disclosure.

| Reference numerals: | | |
|---|---|---|
| 100 Tension assembly | 110 Mechanical coupling member | |
| 200 Housing | | |
| 300 Fixation sub-member | 310 First fixation plate | 320 Press plate |
| 330 Lock member | 340 First winding member | 350 Second fixation plate |
| 351 Fitting groove | 350 Press member | 370 Second winding member |
| 400 Tension detection device | | |

DETAILED DESCRIPTION OF THE EMBODIMENTS

To make the solved technical issues, adopted technical solutions, and achieved technical effects of the present disclosure clearer, the technical solutions of the present disclosure are further described in connection with the accompanying drawings through specific embodiments.

In the description of the present disclosure, the terms "center," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential," indicating orientations or positional relationships are based on the orientations or positional relationships shown in the accompanying drawings and are merely used to describe the present disclosure and simplify the description not intended to indicate or imply that the referred device or element must have a specific orientation, be constructed, and operated in a specific orientation. Therefore, the terms should not be construed as limiting the present disclosure.

In addition, features associated with "first" and "second" can explicitly or implicitly include one or more of such features, and be used to distinguish different features without implying any order or priority. In the description of the present disclosure, "a plurality of" means two or more unless otherwise specified.

In the description of the present disclosure, it should be noted that, unless otherwise explicitly specified and defined, the terms "installation," "connected," and "connection" should be interpreted broadly. For example, the terms can mean fixed connections, detachable connections, integral connections, mechanical connections or electrical connections, direct connections or indirect connections through intermedia, or connections within two elements. For those ordinary skills in the art, the specific meanings of the above terms in the present disclosure can be understood according to specific situations.

A specific structure of a power meter applied at the rowing machine of the embodiments of the present disclosure is described below with reference to FIGS. 3 to 5.

The present disclosure provides a power meter applied at a rowing machine (hereinafter referred to as a power meter). As shown in FIG. 1, the rowing machine includes a tension assembly 100. One end of the tension assembly 100 is connected to a weight, and the other end is for the user to hold. As shown in FIGS. 3 to 5, the power meter of the present disclosure includes a housing 200, a fixation assembly, and a tension detection device 400. The fixation assembly is arranged at two ends of the housing 200. The tension detection device 400 is arranged inside the housing 200 and is connected to the fixation assembly. The tension detection device is configured to detect the tension applied to the fixation assembly. The tension assembly 100 includes two mechanical coupling members 110. The fixation assembly is detachably connected to the two mechanical coupling members 110 to cause a part of the tension assembly 100 between the two mechanical coupling members 110 to be in a relaxed state.

Firstly, it should be noted that the tension detection device 400 can be inside the housing 200 and connected to the fixation assembly. In some embodiments, the fixation assembly can extend into the housing 200 and be connected to the tension detection device 400. In other embodiments, two ends of the tension detection device 400 can extend into the housing 200 and be connected to the fixation assembly. In some embodiments, the fixation assembly can be attached to an outer sidewall of the housing 200, and the tension detection device 400 can be attached to an inner sidewall of the housing 200. The fixation assembly and the tension detection device 400 can be connected through an intermediate connection piece passing through the housing 200. The connection method between the tension detection device 400 and the fixation assembly can be selected according to actual needs.

It is to be understood that, since the fixation assembly of the power meter of the present disclosure is detachably connected to the tension assembly 100 and is not connected to the end of the tension assembly 100 held by the user, the power meter can be connected to any position in the middle of the tension assembly 100 through the fixation assembly during actual use to make the power meter applicable to various types of rowing machines. Meanwhile, the power meter only includes the housing 200, the fixation assembly, and the tension detection device 400. The structure of the power meter is simple, and the manufacturing cost of the power meter is low.

Figure 2:
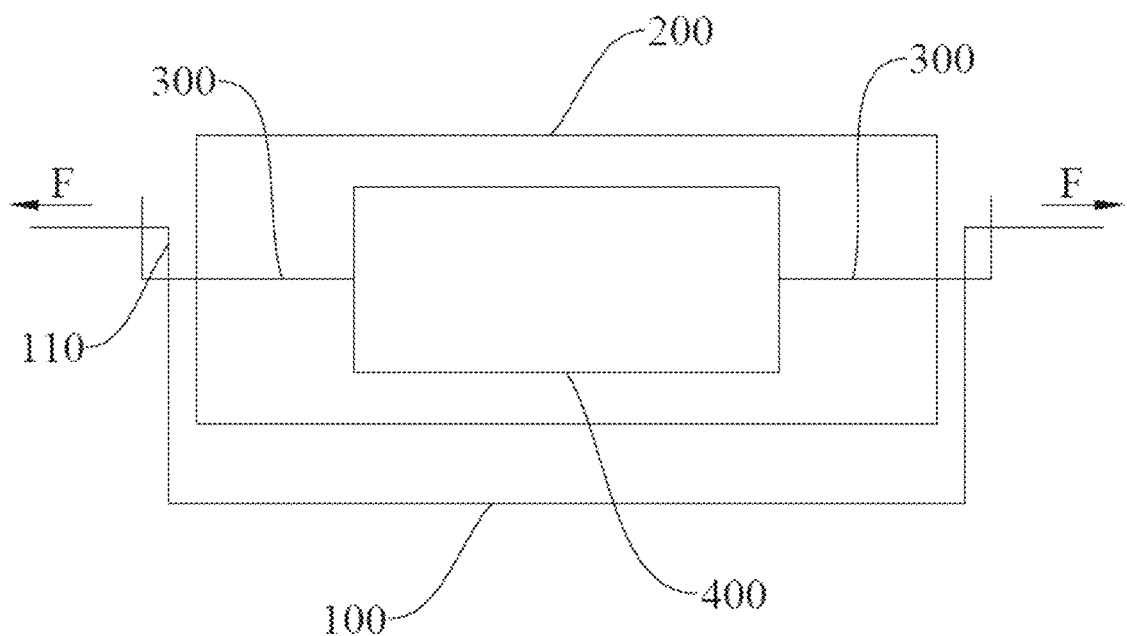
FIG. 2 is a schematic diagram showing an operation principle of a power meter for a rowing machine according to some embodiments of the present disclosure.

FIG. 2 is a schematic diagram showing an operation principle of the power meter. In practical applications, the power meter is connected to the tension assembly 100 through the fixation assembly. The part of the tension assembly 100 connected to the fixation assembly is a mechanical coupling member 110. Since the part of the tension assembly 100 between two mechanical coupling members 110 is in the relaxed state, when the user pulls the tension assembly 100 for training, the mechanical coupling member 110 close to the user can apply a pulling force towards the user at the fixation assembly. The mechanical coupling member 110 close to the weight can also apply a pulling force towards the weight at the fixation assembly. Since the fixation assembly is connected between two ends of a tension sensor, the two ends of the tension sensor can be subjected to pulling forces in two directions to detect the pulling force of the user. The detection can be used to directly detect the pulling force applied by the user with a relatively high detection precision.

It should be added that the tension detection device 400 can include a built-in wireless communication module, which is connected to a user smart wearable apparatus or an intelligent display screen of the rowing machine. Thus, the user can obtain the size of the pulling force detected by the tension detection device 400 in real-time and accurately. Of course, a small display screen can also be arranged at the housing 200, can be directly electrically connected to the tension detection device 400, and can be configured to display the detection value of the tension detection device 400.

Figure 3:
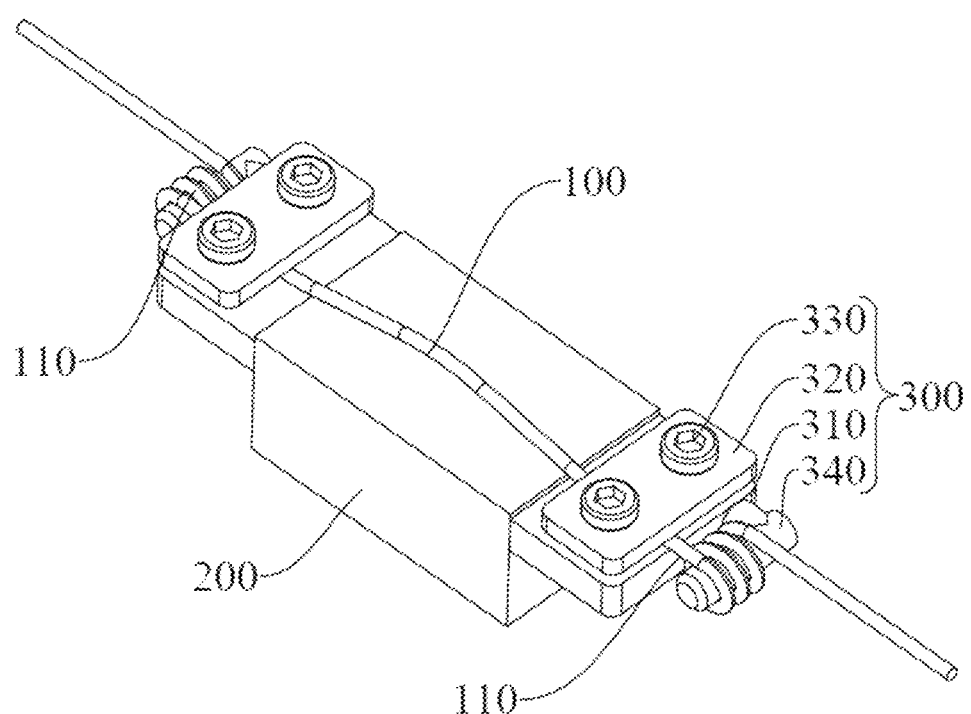
FIG. 3 is a schematic structural diagram showing cooperation between a power meter for a rowing machine and a tension assembly according to embodiment 1 of the present disclosure.
Figure 4:
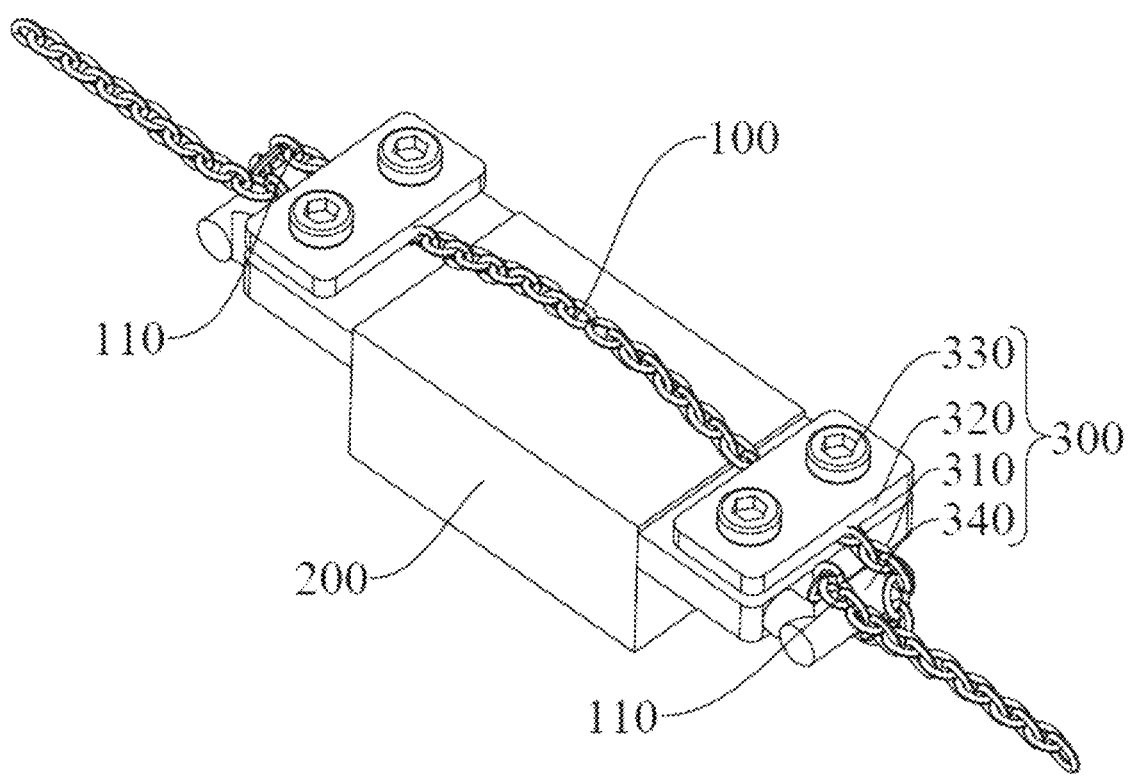
FIG. 4 is a schematic structural diagram showing cooperation between the power meter for the rowing machine and another tension assembly according to embodiment 1 of the present disclosure.
Figure 5:
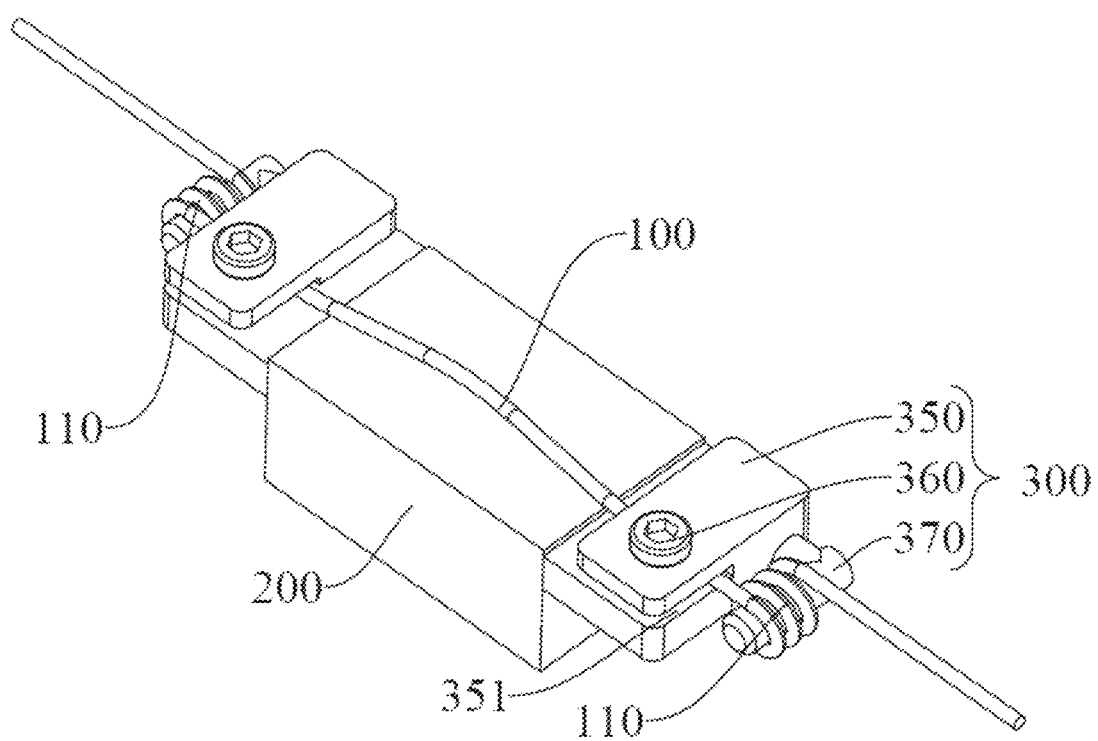
FIG. 5 is a schematic structural diagram showing cooperation between a power meter for a rowing machine and a tension assembly according to embodiment 2 of the present disclosure.

In some embodiments, as shown in FIGS. 3 to 5, the fixation assembly includes two fixation sub-members 300, which are arranged at the two ends of the tension detection device 400, respectively, and the two ends of the tension detection device 400 are mechanically coupled with the two fixation sub-members 300. It can be understood that by using the fixation sub-members 300 as the ends of the tension detection device 400 to be connected to the mechanical coupling members 110 of the tension assembly 100, on one aspect, the power meter can be facilitated to be mounted at the tension assembly 100, and the application of the power meter can be facilitated. On another aspect, the tension detection device 400 and the tension assembly 100 can be ensured to be stably connected, and the tension detection device 400 can be ensured to detect the pulling force applied by the user at the tension assembly 100.

Further, it needs to be noted that a plurality of methods can be provided for the two ends of the tension detection device 400 to be mechanically coupled with the two fixation sub-members 300. In some embodiments, the two ends of the tension detection device 400 can be connected to the fixation sub-members through screws, pins, or rivets. In other embodiments, the two ends of the tension detection device 400 can be directly welded or glued to the fixation sub-members 300. In some other embodiments, the tension detection device 400 can be connected to the fixation sub-members 300 via structures like clips. The specific connection method can be selected according to actual needs.

In some embodiments, as shown in FIGS. 3 and 4, each fixation sub-member 300 includes a first fixation plate 310 and a press plate 320. The first fixation plate 310 is connected to an end of the tension detection device 400, and the press plate 320 is connected to the first fixation plate 310. The mechanical coupling member 110 is clamped between the first fixation plate 310 and the press plate 320. It can be understood that during the actual assembly process, the first fixation plate 310 can be first connected to the tension detection device 400, the tension assembly 100 can be then arranged at the first fixation plate 310, and the press plate 320 can be finally mounted at the first fixation plate 310 to clamp the mechanical coupling member 110 between the first fixation plate 310 and the press plate 320. The mounting method is very simple and facilitates the installation and removal of the power meter.

In some embodiments, as shown in FIGS. 3 and 4, the fixation sub-member 300 also includes a lock member 330. The lock member 330 passes through the first fixation plate 310 and the press plate 320 and is configured to cause the press plate 320 to clamp the mechanical coupling member 110 at the first fixation plate 310. It can be understood that during the actual measurement process if the mechanical coupling member 110 moves relative to the fixation sub-member 300, the detection precision of the tension detection device 400 can be lowered. In some embodiments, by adding the lock member 330, the mechanical coupling member 110 can be tightly clamped between the first fixation plate 310 and the press plate 320, which prevents the mechanical coupling member 110 from moving relative to the fixation sub-member 300 and ensures the detection precision of the tension detection device 400.

In some embodiments, the lock member 330 can be a screw. Therefore, in actual operation, a pressing degree of the press plate 320 to the mechanical coupling member 110 can be adjusted by only rotating the screw. The operation is simple. Of course, in some other embodiments of the present disclosure, the lock member 330 can be selected according to actual needs.

In some embodiments, as shown in FIGS. 3 and 4, two lock members 330 are provided. The two lock members 330 are arranged on two sides of the mechanical coupling member 110. It can be understood that with the two lock members 330, the mechanical coupling member 110 can be tightly clamped between the first fixation plate 310 and the press plate 320 maximally, which prevents the mechanical coupling member 110 from moving relative to the fixation sub-members 300 and ensures the detection precision of the tension detection device 400.

It needs to be noted that, in other embodiments of the present disclosure, a fixing pin can be arranged at one of the first fixation plate 310 and the press plate 320, and a fixing hole cooperating with the fixing pin can be provided at the other one of the first fixation plate 310 and the press plate 320. The fixing pin can be a conical post. Thus, without the lock member 330, the mechanical coupling member 110 can be clamped between the first fixation plate 310 and the press plate 320. That is, in some other embodiments of the present disclosure, the connection method between the first fixation plate 310 and the press plate 320 can be selected according to the actual needs and is not limited to the technical solution with the lock member 330.

In some embodiments, as shown in FIGS. 3 and 4, the fixation sub-member 300 includes a first winding member 340. The first winding member 340 cooperates with the mechanical coupling member 110. The mechanical coupling member 110 can be wounded at least one turn around the first winding member 340. It can be understood that during the actual measurement process if the mechanical coupling member 110 moves relative to the fixation sub-members 300, the detection precision of the tension detection device 400 can be lowered. According to the detection principle, when the connection of the mechanical coupling member 110 is more stable relative to the fixation sub-members 300, the detection precision can be higher. In some embodiments, after the mechanical coupling member 110 is wounded at least one turn at the first winding member 340, the mechanical coupling member 110 can be fixed at the fixation sub-members 300 and cannot move relative to the fixation sub-members 300. Thus, the detection precision of the tension detection device 400 can be maximally ensured.

In some embodiments, as shown in FIG. 5, the fixation sub-member 300 includes a second fixation plate 350. The second fixation plate 350 is connected to the end of the tension detection device 400. The second fixation plate 350 includes a fitting groove 351. One end of the fitting groove 351 is open, and the mechanical coupling member 110 passes through the fitting groove 351 and is clamped in the fitting groove 351 by a press member 360 passing through the second fixation plate 350. It can be understood that during actual operation, the mechanical coupling member 110 can be fixed at the second fixation plate 350 by only passing the mechanical coupling member 110 through the open end of the fitting groove 351. Then, the mechanical coupling member 110 can be clamped in the fitting groove 351 through the press member 360 passing through the second press plate 350. Thus, the installation is convenient.

In some embodiments, as shown in FIG. 5, the second fixation plate 350 also includes a second winding member 370. The mechanical coupling member 110 passes through the fitting groove 351 and is wounded at the second winding member 370. In the actual detection process, if the mechanical coupling member 110 moves relative to the second fixation plate 350, the detection precision of the tension detection device 400 can be lowered. According to the detection principle, when the connection of the mechanical coupling member 110 is more stable relative to the second fixation plate 350, the detection precision can be higher. In some embodiments, after the mechanical coupling member 110 is wounded at least one turn at the second winding member 370, the mechanical coupling member 110 can be fixed at the second fixation plate 350 and cannot move relative to the second fixation plate 350, Thus, the detection precision of the tension detection device 400 can be maximally ensured.

In some embodiments, a distance detection device can be also provided inside the housing 200. It can be understood that during actual operation, the distance detection device can be configured to detect the displacement of the housing 200. Thus, the power meter of the present disclosure can detect the pulling force and the position of the tension assembly 100, which improves the user experience.

Embodiment 1

With reference to FIGS. 3 and 4, the power meter of an embodiment of the present disclosure is described below.

As shown in FIG. 3, the power meter of embodiments of the present disclosure includes the housing 200, the fixation assembly, and the tension detection device 400. The tension detection device 400 is arranged inside the housing 200. The fixation assembly includes the two fixation sub-members 300. Each fixation sub-member 300 includes the first fixation plate 310, the press plate 320, the lock member 330, and the first winding member 340. The first fixation plate 310 passes through the housing 200 and is connected to the end of the tension detection device 400. The press plate 320 is spaced from the first fixation plate 310. Two locking members 330 are provided. Each lock member 330 passes through the first fixation plate 310 and the press plate 320, and is configured to cause the press plate 320 to clamp the tension assembly 100 of the rowing machine at the first fixation plate 310. The first winding member 340 is connected to the first fixation plate 310 and cooperates with the mechanical coupling member 110. The mechanical coupling member 110 is wounded at least one turn at the first winding member 340.

The power meter of embodiments of the present disclosure can be used on a rowing machine with an elastic rope as the tension assembly 100 (as shown in FIG. 3), and also on a rowing machine with a chain as the tension assembly 100 (as shown in FIG. 4).

Embodiment 2

With reference to FIG. 5, the power meter of an embodiment of the present disclosure is described below.

As shown in FIG. 5, the power meter of embodiments of the present disclosure includes the housing 200, the fixation assembly, and the tension detection device 400. The tension detection device 400 is located inside the housing 200. The fixation assembly includes the two fixation sub-members 300. Each fixation sub-member 300 includes the second fixation plate 350, the second winding member 370, and the press member 360. The second fixation plate 350 is connected to the end of the tension detection device 400. The second fixation plate 350 includes a fitting groove 351. One end of the fitting groove 351 is open. The mechanical coupling member 110 passes through the fitting groove 351 and is wounded around the second winding member 370. The press member 360 passes through the second fixation plate 350 and extends into the fitting groove 351 to press against the mechanical coupling member 110.

The present disclosure further provides a rowing machine including a body of the rowing machine, the tension assembly 100, and the power meter applied at the rowing machine. An end of the tension assembly 100 can cooperate with the body of the rowing machine. The other end of the tension assembly 100 can be connected to the handle. The power meter applied to the rowing machine can be detachably arranged at the middle of the tension assembly 100. It can be understood that since the rowing machine of the present disclosure includes the power meter applied to the rowing machine, the rowing machine can accurately detect the pulling force applied by the user at the tension assembly 100. The structure is simple, and the cost is low.

In addition, as shown in FIG. 2 and FIG. 3, the tension assembly 100 includes an elastic rope, a chain, or other rope-shaped structures, which can be selected according to actual needs.

In the description of the specification, the terms "some embodiments" and "other embodiments" are intended to indicate that specific features, structures, materials, or characteristics described in connection with embodiments or examples are included in at least one embodiment or example of the present disclosure. In the specification, the exemplary description of the above terms does not necessarily refer to the same embodiment or example. Moreover, the described features, structures, materials, or characteristics can be combined in a suitable manner in any one or more embodiments or examples.

The above are merely some embodiments of the present disclosure. For those ordinary skills in the art, modifications can be made to embodiments and application ranges according to the concept of the present disclosure. The content of the specification should not be considered as limiting of the present disclosure.

What is claimed is:
1. A power meter comprising:
a housing;

a fixation assembly arranged at two ends of the housing and configured to be detachably connected to two mechanical coupling members of a tension assembly of a rowing machine to cause a part of the tension assembly between the two mechanical coupling members to be in a relaxed state; and a tension detection device arranged inside the housing and connected to the fixation assembly, the tension detection device being configured to detect a pulling force applied on the fixation assembly.

2. The power meter according to claim 1, wherein the fixation assembly includes two fixation sub-members arranged at and mechanically coupled to two ends of the tension detection device, respectively.

3. The power meter according to claim 2, wherein each of the two fixation sub-members includes:

a fixation plate connected to one of the two ends of the tension detection device; and a press plate connected to the fixation plate, the fixation plate and the press plate being configured to clamp a corresponding one of the two mechanical coupling members between the fixation plate and the press plate.

4. The power meter according to claim 3, wherein each of the two fixation sub-members further includes a lock member passing through the fixation plate and the press plate, and configured to clamp the corresponding one of the two mechanical coupling members between the fixation plate and the press plate.

5. The power meter according to claim 4, wherein in each of the two fixation sub-members, the lock member is one of two lock members of the fixation sub-member that are arranged on two sides of the corresponding one of the two mechanical coupling members, respectively.

6. The power meter according to claim 2, wherein each of the two fixation sub-members includes a winding member configured to cooperate with a corresponding one of the two mechanical coupling members to cause the corresponding one of the two mechanical coupling members to be wound at least one turn around the winding member.

7. The power meter according to claim 2, wherein each of the two fixation sub-members includes a fixation plate connected to an end of the tension detection device and including a fitting groove, one end of the fitting groove being open configured to allow a corresponding one of the two mechanical coupling members to pass through the fitting groove to be clamped at the fitting groove by a press member passing through the fixation plate.

8. The power meter according to claim 7, wherein the fixation plate further includes a winding member configured to allow the corresponding one of the two mechanical coupling members to be wound around the winding member.

9. The power meter according to claim 1, further comprising:

a distance detection device within the housing.

10. A rowing machine comprising:

a body;

a tension assembly including two mechanical coupling members, one end of the tension assembly being configured to cooperate with the body, and another end of the tension assembly being connected to a handle; and a power meter detachably arranged at a middle of the tension assembly and including:

a housing;

a fixation assembly arranged at two ends of the housing and configured to be detachably connected to the two mechanical coupling members to cause a part of the tension assembly between the two mechanical coupling members to be in a relaxed state; and a tension detection device arranged inside the housing and connected to the fixation assembly, the tension detection device being configured to detect a pulling force applied on the fixation assembly.

11. The rowing machine according to claim 10, wherein the fixation assembly includes two fixation sub-members arranged at and mechanically coupled to two ends of the tension detection device, respectively.

12. The rowing machine according to claim 11, wherein each of the two fixation sub-members includes:

a fixation plate connected to one of the two ends of the tension detection device; and a press plate connected to the fixation plate, the fixation plate and the press plate being configured to clamp a corresponding one of the two mechanical coupling members between the fixation plate and the press plate.

13. The rowing machine according to claim 12, wherein each of the two fixation sub-members further includes a lock member passing through the fixation plate and the press plate, and configured to clamp the corresponding one of the two mechanical coupling members between the fixation plate and the press plate.

14. The rowing machine according to claim 13, wherein in each of the two fixation sub-members, the lock member is one of two lock members of the fixation sub-member that are arranged on two sides of the corresponding one of the two mechanical coupling members, respectively.

15. The power meter rowing machine according to claim 11, wherein each of the two fixation sub-members includes a winding member configured to cooperate with a corresponding one of the two mechanical coupling members to cause the corresponding one of the two mechanical coupling members to be wound at least one turn around the winding member.

16. The rowing machine according to claim 11, wherein each of the two fixation sub-members includes a fixation plate connected to an end of the tension detection device and including a fitting groove, one end of the fitting groove being open configured to allow a corresponding one of the two mechanical coupling members to pass through the fitting groove to be clamped at the fitting groove by a press member passing through the fixation plate.

17. The rowing machine according to claim 16, wherein the fixation plate further includes a winding member configured to allow the corresponding one of the two mechanical coupling members to be wound around the winding member.

18. The rowing machine according to claim 10, wherein the power meter further includes a distance detection device within the housing.

* * * * *